March 13, 1962 W. E. R. PULMAN 3,024,520
TURRET OPERATING MECHANISM FOR AUTOMATIC MACHINE TOOLS
Filed May 2, 1957 4 Sheets-Sheet 1

Inventor
William Elias Reginald Pulman

March 13, 1962    W. E. R. PULMAN    3,024,520
TURRET OPERATING MECHANISM FOR AUTOMATIC MACHINE TOOLS
Filed May 2, 1957    4 Sheets-Sheet 3

March 13, 1962 W. E. R. PULMAN 3,024,520
TURRET OPERATING MECHANISM FOR AUTOMATIC MACHINE TOOLS
Filed May 2, 1957 4 Sheets-Sheet 4

United States Patent Office 3,024,520
Patented Mar. 13, 1962

3,024,520
TURRET OPERATING MECHANISM FOR AUTOMATIC MACHINE TOOLS
William Elias Reginald Pulman, 22 Park Ave., Southwick, Brighton, England, assignor of one-half to Eric Aron, Sussex, England
Filed May 2, 1957, Ser. No. 656,612
Claims priority, application Great Britain May 3, 1956
2 Claims. (Cl. 29—44)

This invention relates to feed mechanisms for turrets and turret slides of turret lathes.

According to the present invention there is provided in a turret lathe of the class comprising a tool-receiving turret, a turret slide whereupon the turret is rotatably mounted, a machine bed whereon the slide is slidingly mounted and a combined turret feed and indexing mechanism comprising an auxiliary slide mounted on the turret slide for parallel movement and a crankshaft and connecting rod mechanism whereof the crankshaft is journalled on the turret slide and whereof the connecting rod has an end coupled to the auxiliary slide which mechanism causes relative movement of the slides simultaneously with indexing of the turret; a construction of feed mechanism for the turret and turret slide comprising a rack on the auxiliary slide, a toothed quadrant rockably mounted on the machine bed and engaging the rack, cam means engaging the quadrant to rock it and thereby to move the slides and turret simultaneously as one, and a spring having a first abutment on the machine bed and a second abutment on the rack and urging the quadrant into contact with the cam means, said auxiliary slide and said crankshaft and connecting rod mechanism acting as a movement-transmitting means between the quadrant and the turret slide.

According to a feature of the invention there is provided in the connection between the connecting rod and the rack a part which permits adjustment of the point of connection relative to the rack in the direction of movement of the turret slide.

Figure 1:
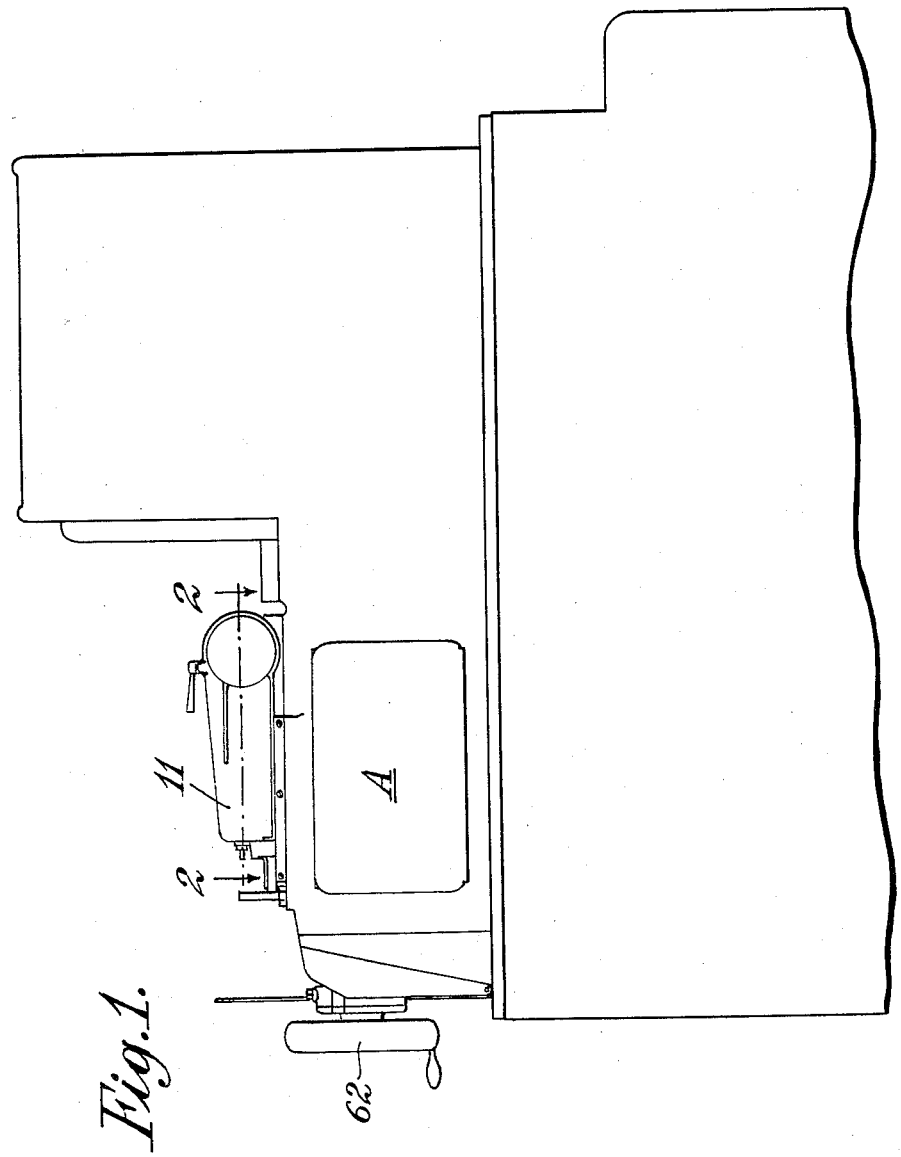
Figure 2:
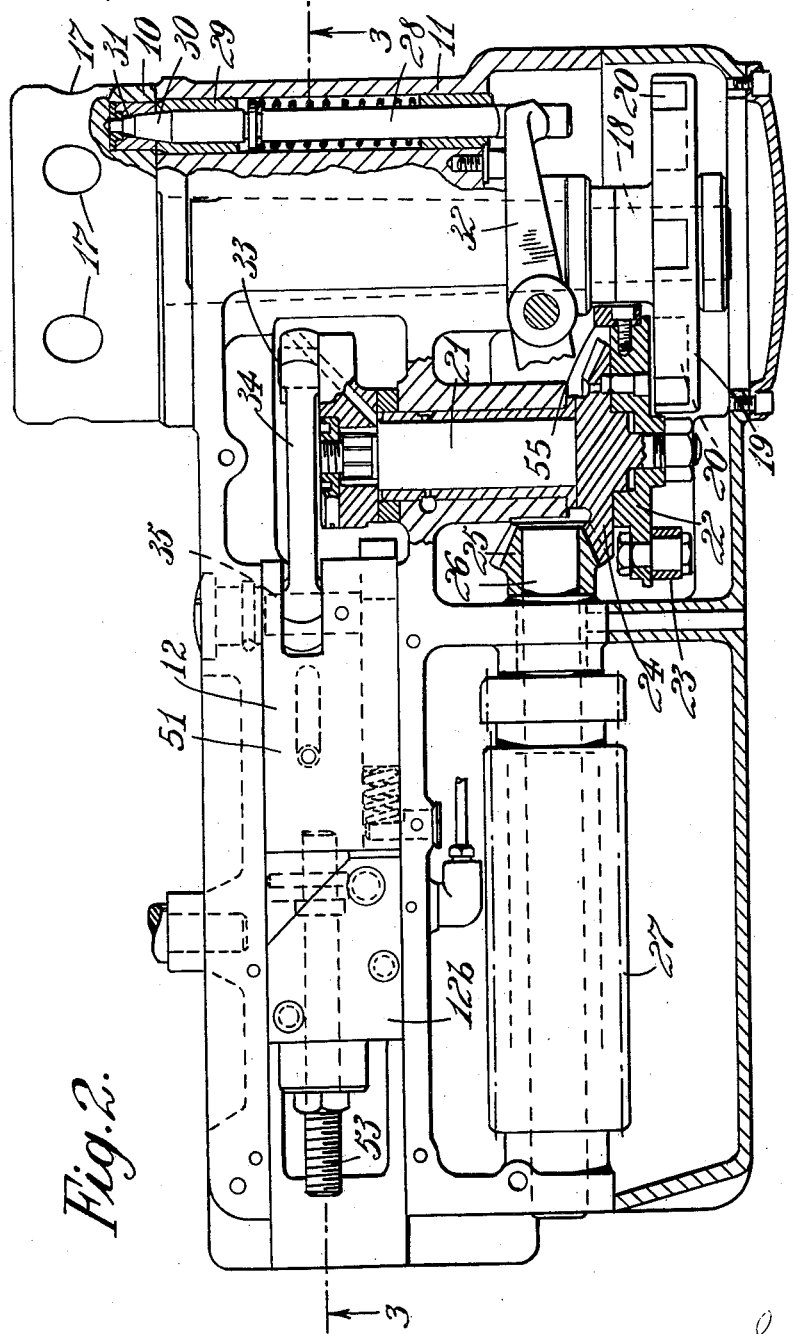
Figure 3:
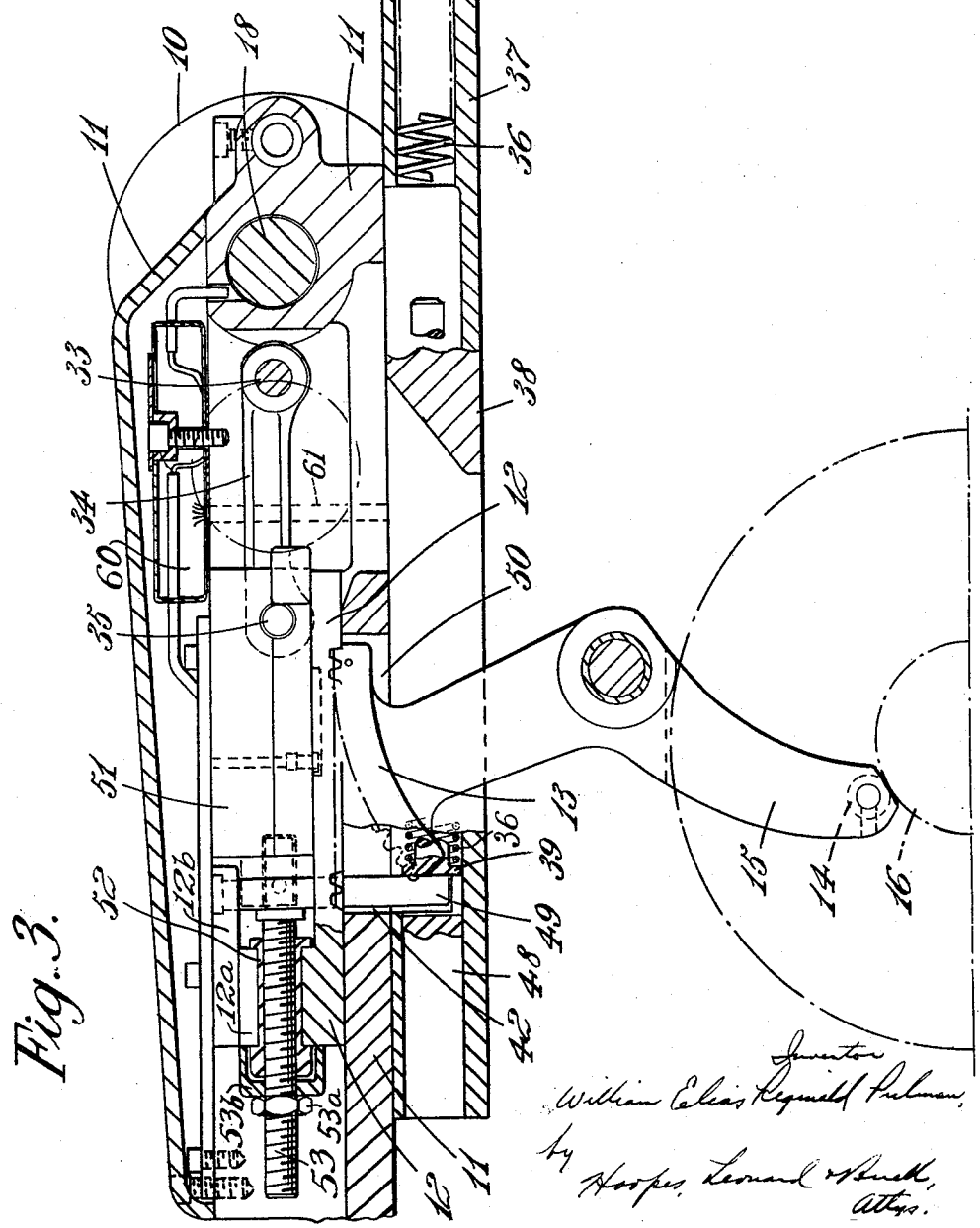
Figure 4:
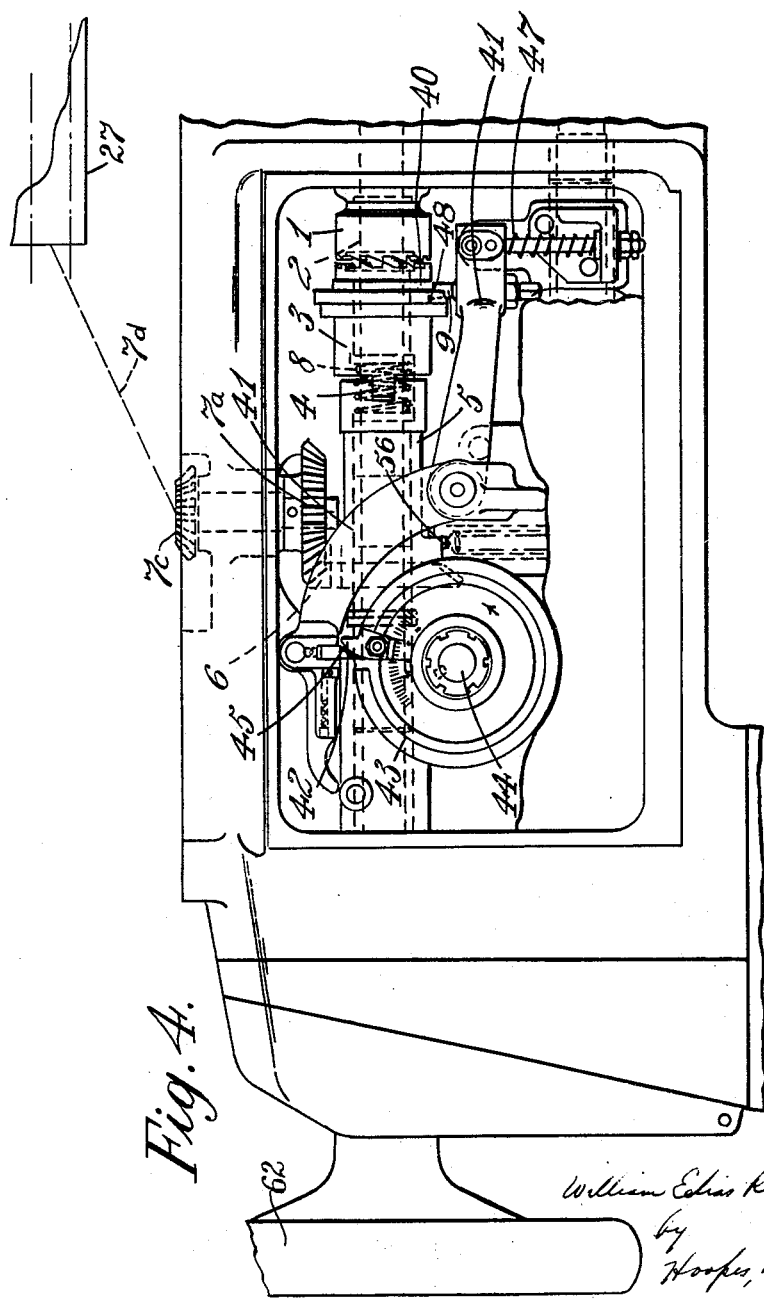

The following is a description of the invention as applied to the turret mechanism of a single spindle turret automatic screw lathes, reference being made to the accompanying drawings in which:

FIGURE 1 is a diagrammatic view of the general arrangement showing the turret in position on the automatic lathe, FIGURE 2 is a sectional plan on the line 2—2 of FIGURE 1 of a part of the turret slide on which is mounted the turret indexing mechanism and turret feed mechanism, FIGURE 3 is a section on the line 3—3 of FIGURE 2, and FIGURE 4 is a view of the backshaft and one-revolution clutch mechanism and is as seen when the cover plate A is removed.

The turret lathe shown diagrammaticaly in FIGURE 1 is of well known general pattern and will not be described in detail. The lathe is provided with tool slides which are actuated by disc cams in known manner, these cams being normally designed for a particular workpiece. In such machines the idle motions, i.e. the bar feed, speed change, indexing etc., are controlled by a fast running constant speed shaft commonly known as the back shaft. Shafts carrying the disc cams are driven at a comparatively low speed from the backshaft by suitable gearing to revolve the disc cams at the correct cycle time for producing a component.

The speed changing, collet opening, bar feeding, collet closing and turret indexing motions are taken from the backshaft by means of one revolution clutches. These clutches are normally controlled by means of trips mounted on suitable drum rotating at the same speed as the disc cams. It will be seen that due to the constant speed of the backshaft the above-mentioned operations take place in a constant time and are not controlled by the cycle time. The actuating trips are adjustable around the circumference of the drums so that the idle motions can take place at any determined point in the sequence of operations for producing the component.

All one revolution clutches as used on automatic machines have certain basic design characteristics. The arrangement which is shown in FIGURE 4 of a one revolution clutch actuating a turret indexing mechanism and which in the machine illustrated is covered by cover plate A typifies the basic design. A dog tooth clutch member 1 is pinned to the backshaft 2 which revolves at constant comparatively high speed. Opposed to this is a sliding clutch member 3 which is coupled by a coupling 4 to a sleeve 5 rotatable on the shaft 1. The sleeve has secured to it a bevel gear 6 which is in constant mesh with a bevel gear 7a for driving the turret indexing gearing. Housed within the sleeve 5 is a compression spring 8, which tends to push the clutch member 3 into engagement with the clutch member 1. The clutch member 3 is held out of engagement with the member 1 by the end of a dog-point operating screw 9 engaging in a recess on a cam face 40 which is formed on the member 3 and faces in an axial direction. The operating screw 9 is tapped into a rocker arm 41 which trips when a trip device 45 on it is operated by a trip 42 adjustably mounted as previously mentioned on a drum 43 revolving at the comparatively low speed of the disc cam shaft 44 to which it is fixed, causing the end of the screw 9 to be withdrawn radially outwardly from the cam face. The clutch part 3 then slides instantly into engagement with the clutch part 1 under the action of the spring 8 and is driven through one revolution. Continued rotation of drum 43 disengages trip 42 from device 45, and the rocker arm 41 is urged back towards its formed position by the spring 47. Due to rotation of the clutch part 3, however, the operating screw 9 cannot yet re-engage in the recess but instead rides on the periphery of the clutch part 3. When the one revolution is almost completed, a cam projection which is formed on the periphery of the clutch part 3 engages the side of the end of the screw 9 drawing the clutch out of engagement. As the revolution is completed screw 9, urged by spring 47, drops into the recess on the cam face 40. Positive stopping of the revolution of sliding clutch member 43 after one revolution is assured by the engagement of a spring-loaded roller 46 in a V-shaped groove (not shown) cut in the periphery of the sleeve 5.

The backshaft can be rotated manually, for setting up purposes, by means of hand wheel 62.

Referring to FIGURES 2 and 3 the turret head 10 is mounted on a slide 11 which houses the indexing mechanism and a rack 12. The slide also houses a lubricant reservoir 60 from which lead wick-like elements 61 for lubricating the slideway. The rack is engaged by a rocking toothed quadrant 13 whereby feeding movement is imparted to the slide 11 towards and away from the work. A roller 14 on a lever 15 at the lower end of the quadrant rides on a slow running disc type cam 16 controlling the turret feeding movement of the slide 11. Holes 17 are provided in the periphery of the turret head to carry tools which are successively indexed into the working position.

Fitted to the end of a shank 18 attached to the turret head is a Geneva plate 19 in the face of which are machined 6 radial slots 20 equally spaced. A small crankshaft 21 is mounted parallel with the turret shank on the outer end of which crankshaft is spigoted an indexing disc 22 carrying a roller 23, adjacent to the Geneva plate. The crankshaft is connected by bevel gearing 24 25 to an operating shaft 26 carrying a long spur gear 27.

A drive is transmitted to the spur gear 27 from the backshaft 2 through the one revolution clutch, bevel gears 6 and 7a, shaft 7b and bevel gear 7c. The last-mentioned bevel gear 7c is drivingly coupled, as diagrammatically indicated by chain line 7d, to the spur gear 27. While in the working position, the turret head 10 is rigidly locked by a spring-loaded plunger 28 mounted in bushes 29, in the turret slide, the tapered end 30 of which seats in a hardened bush 31 in the turret head.

When the one revolution clutch which controls indexing is engaged, the locking plunger is first withdrawn by a lever arm 32 (part of which has been cut away in FIGURE 2) under the action of an axially-facing cam portion 55 secured to the indexing disc 22 as it rotates through one revolution causing the roller 23 to enter one of the Geneva slots 20 and so swing the turret through an arc of 60°, the distance from one station to the next; the locking plunger 28 then springs back into a corresponding bush 31 in the turret 10 as the indexing disc completes one revolution and locks the turret.

A crankpin 33, on the opposite end of the crankshaft 21, forms a journal for a connecting rod 34. The other end of the connecting rod is pivoted at 35 to a member 51 which is adjustably connected by a screw 53 to a block 52 which forms part of the rack structure. The block is free to slide relative to the turret slide casting 11 but while the turret is in working position, the crankpin lies on dead centre and holds the rack rigid. Thus feeding movement is imparted to the turret slide by the movement of the quadrant 13.

During indexing, relative movement occurs between the rack 12 and the turret slide 11 owing to the action of the crank, which movement consists in the withdrawal of the turret slide in a direction away from the work and the return thereof to its former position when indexing is complete. The circle of movement of the crankpin 33 relative to the slide 11, which occurs about the axis of the shaft 21 during indexing, is indicated in chain lines in FIGURE 3.

The slide is biased towards its position furthest away from the workpiece by a return spring 36.

The spring 36 according to this invention is located in a housing 37 forming a part of the slideway 38 on the machine bed so that one end of the spring abuts the end of the housing and the other end of the spring abuts a shoulder 39 on a cylindrical element 48 which slides in the housing and has in contact with it a laterally extending pin 49. The pin extends out through a slot in the side of the housing and through a slot 50 in the slide 11 through which the toothed quadrant 13 also extends. The pin 49 is fixed to the rack 12 which is slidably mounted on the other side of the slide. Thus the spring 36 is disposed between a fixed part of the machine and the rack, which is in turn positively connected to the cam lever quadrant. The spring 36, therefore, acting through the rack holds the cam lever quadrant 15 firmly in contact with the cam 16. The strength of spring 36 ensures that when indexing of the turret head occurs, the cam lever quadrant 15 of the rack 12 remain in the position dictated by the cam 16. The relative movement of the rack 12 and the turret slide 11 caused by indexing consists, therefore, of a cyclic movement of the turret slide 11 which movement is superimposed on the rigidly-controlled movement of the rack caused by the cam.

I claim:

1. In a turret lathe of the class comprising a tool-receiving turret, a turret slide whereon the turret is rotatably mounted, a machine bed whereon the slide is slidingly mounted and a combined turret feed and indexing mechanism comprising an auxiliary slide mounted on the turret slide for parallel movement and a crankshaft and connecting rod mechanism, the crankshaft journalled on the turret slide and the connecting rod has an end coupled to the auxiliary slide which mechanism causes relative movement of the slide simultaneously with indexing of the turret, a rack on the auxiliary slide, a toothed quadrant rockably mounted on the machine bed and engaging the rack, cam means engaging the quadrant to rock it and thereby to move the slides and turret simultaneously as one, and a spring having a first abutment on the machine bed and a second abutment on the rack and urging the quadrant into contact with the cam means, said auxiliary slide and said crankshaft and connecting rod mechanism acting as a movement-transmitting means between the quadrant and the turret slide.

2. In a turret lathe as claimed in claim 1 the provision, in the connection between the connecting rod and the rack, of a part which permits adjustment of the point of connection relative to the rack in the direction of movement of the turret slide.

References Cited in the file of this patent
UNITED STATES PATENTS

| | | |
|---|---|---|
| 604,306 | Davenport | May 17, 1898 |
| 2,748,624 | Costello | June 5, 1956 |